Figure 1:
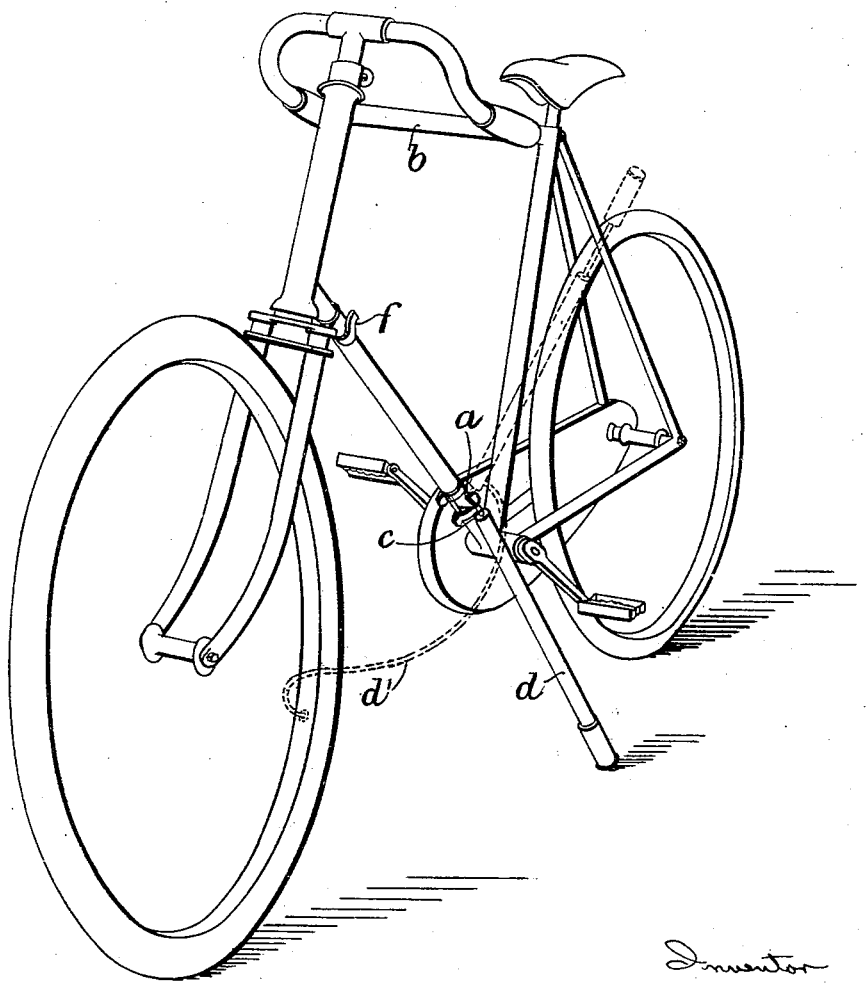

No. 633,036. Patented Sept. 12, 1899.
H. H. PERKES.
SUPPORT FOR BICYCLES.
(Application filed Nov. 10, 1898.)

(No Model.) 2 Sheets—Sheet 1.

FIG. I.

No. 633,036. Patented Sept. 12, 1899.
H. H. PERKES.
SUPPORT FOR BICYCLES.
(Application filed Nov. 10, 1898.)
(No Model.) 2 Sheets—Sheet 2.
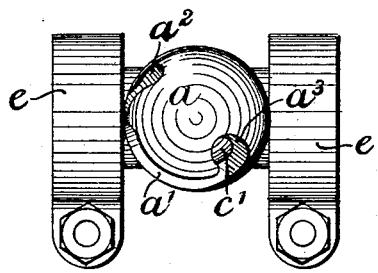
FIG. 2
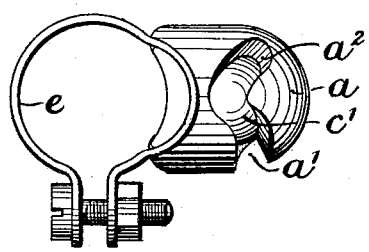
FIG. 3
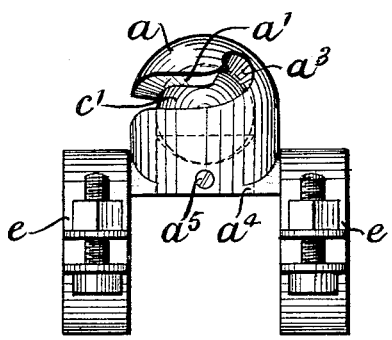
FIG. 4
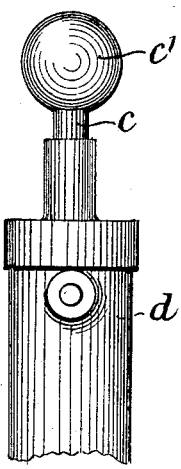
FIG. 5
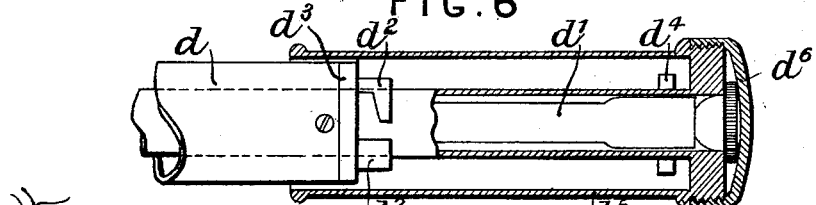
FIG. 6
THE NORRIS PETERS CO., PHOTO-LITHO., WASHINGTON, D. C.

UNITED STATES PATENT OFFICE.

HENRY HYDE PERKES, OF LONDON, ENGLAND.

SUPPORT FOR BICYCLES.

SPECIFICATION forming part of Letters Patent No. 633,036, dated September 12, 1899.

Application filed November 10, 1898. Serial No. 696,112. (No model.)

*To all whom it may concern:*

Be it known that I, HENRY HYDE PERKES, gentleman, a subject of the Queen of Great Britain, residing at 173 Strand, London, W.C., England, have invented certain new and useful Improvements in or Relating to Portable Stands or Supports for Bicycles, of which the following is a specification.

The object of my invention is to effect improvements in that class of stands or supports for bicycles in which a strut is hinged to the frame; and my invention consists in providing improved means for automatically guiding and securing such struts in position; also, in adapting such means so that the strut may be used as a pump for inflating the tires of the bicycle; and in order that my said invention may be particularly described and ascertained reference is hereby made to the accompanying drawings, in which similar letters of reference indicate corresponding parts.

Figure 1 is a perspective view of a bicycle fitted with my invention. Figs. 2, 3, and 4 are respectively front, side, and under side views of the strut connection. Fig. 5 is an elevation of a portion of the pump-strut. Fig. 6 is a longitudinal section of the pump-handle, illustrating one mode of locking the same to the pump barrel or strut.

According to my invention I clip or otherwise attach a shell $a$ to the frame $b$ of the bicycle, preferably to the lower front tube, as shown in Fig. 1. In this shell $a$ I mount one end $c$ of the strut $d$, which is preferably made cylindrical and provided with a piston or pistons adapted to act as a pump. As shown in Figs. 2, 3, and 4, the shell is preferably of a globular shape.

The shell $a$ is formed with two slots, one, $a'$, downward and the other, $a^2$, upward. The slot $a'$ is formed with a notch $a^3$, so that when the end $c$ of the strut $d$ (shown in Fig. 5) reaches the end of the slot $a'$ and the bicycle is supported thereby the strut becomes engaged in the notch $a^3$, thus securing it in position. The end of the strut is provided with a ball $c'$, which fits the interior of the globular shell $a$, the strut not being shown connected in Figs. 2, 3, and 4 for greater clearness. $e$ is the clip, by means of which the shell is fixed to the frame $b$. The shell $a$ is formed with an opening at $a^4$, through which the ball is passed, a plug being afterward inserted and secured in position by screws $a^5$ or by other suitable means. The slot $a^2$ serves to guide the strut upward, so that it may be readily used for inflating purposes, as shown by the dotted lines in Fig. 1, the connector $d'$ being when not in use stored within the tubular piston, Fig. 6. The strut $d$ is normally held parallel to the tube of the frame $b$ by a clip $f$ or other suitable device.

In order to prevent the piston falling out the pump or strut $d$, I provide a bayonet-joint or other means, one portion $d^2$ of the joint being fixed on the cover or cap $d^3$ of the pump, Fig. 6, and the other portion $d^4$ within the cylindrical handle $d^5$. In this figure one end of the connector $d'$ is shown secured from falling out and from mud and dust by the screw cap or cover $d^6$. When the shell $a$ is formed cylindrical or of other shape, the strut is jointed within such shell by a universal joint, the slots being formed so as to carry out the requirements of supporting and pumping, as described with reference to the globular shell. The strut might be in some cases provided with a suitable lock, by means of which the pedal or crank may be readily locked thereto in order to prevent theft.

In using my invention the strut is liberated from the clip $f$, and it falls by gravity, the slot $a'$ guiding the same automatically into its supporting position, in which it is secured by the notch $a^3$. The bicycle is then supported by the strut and is unable to move longitudinally by reason of the strut being unable to move on its joint and the weight of the bicycle retaining the strut in the notch.

I claim—

1. The combination with a block or fitting having a slot curving upward and downward and terminating in an enlargement, of a strut having a spherical end fitted to work within the chamber of the fitting and a shank working in the said slot by which the strut is guided automatically to its position and there held, substantially as specified.

2. The combination with a block or fitting formed hollow and provided with a slot curving upward and downward and terminating in an enlargement, of a strut with a spherical end working in the hollow of the block and a shank working in the slot, and a plug held in the block after the spherical portion of the strut is placed in position, substantially as and for the purpose specified.

3. The combination with a block or fitting formed hollow and having a curved slot extending upward and downward and terminating in an enlargement, of a strut having a cylindrical portion and a portion movable therein to form a piston and having at its upper end a spherical portion working in the hollow of the block and a shank working through the slot whereby the strut automatically assumes its correct position and serves both as a support and as an inflating device, substantially as specified.

In testimony whereof I have hereunto set my hand in presence of two subscribing witnesses.

HENRY HYDE PERKES.

Witnesses:
GEORGE C. DOWNING,
FRED HARRIS.